(12) United States Patent
Francis

(10) Patent No.: US 7,920,930 B2
(45) Date of Patent: Apr. 5, 2011

(54) PROCESS FOR RAPIDLY CONTROLLING A PROCESS VARIABLE WITHOUT OVERSHOOT USING A TIME DOMAIN POLYNOMIAL FEEDBACK CONTROLLER

(76) Inventor: Robert H. Francis, Gaithersburg, MD (US)

( * ) Notice: Subject to any disclaimer, the term of this patent is extended or adjusted under 35 U.S.C. 154(b) by 400 days.

(21) Appl. No.: 12/254,773

(22) Filed: Oct. 20, 2008

(65) Prior Publication Data

US 2009/0082883 A1    Mar. 26, 2009

Related U.S. Application Data

(63) Continuation of application No. 11/173,024, filed on Jul. 1, 2005, now Pat. No. 7,457,673, which is a continuation-in-part of application No. 09/771,799, filed on Jan. 29, 2001, now abandoned.

(51) Int. Cl.
*G05B 13/02* (2006.01)

(52) U.S. Cl. ........... 700/41; 700/28; 700/37; 700/42; 700/44; 700/45

(58) Field of Classification Search ............ 700/28, 700/37, 41, 42, 44, 45

See application file for complete search history.

(56) References Cited

U.S. PATENT DOCUMENTS

| | | | | |
|---|---|---|---|---|
| 3,419,777 A * | 12/1968 | Asseo | ............ | 388/806 |
| 5,191,521 A * | 3/1993 | Brosilow | ............ | 700/40 |
| 5,394,322 A * | 2/1995 | Hansen | ............ | 700/37 |
| 5,754,424 A * | 5/1998 | Melvin | ............ | 700/37 |
| 7,546,170 B2 * | 6/2009 | Ayala et al. | ............ | 700/45 |

* cited by examiner

*Primary Examiner* — Ronald D Hartman, Jr.
(74) *Attorney, Agent, or Firm* — Erickson, Kernell, Derusseau & Kleypas, LLC

(57) ABSTRACT

A method for controlling a process variable as it approaches a predetermined value (setpoint) so that the setpoint is not exceeded. The method employs a time domain polynomial equation in a feedback configuration and utilizes a controller that acts as an On/Off controller until the process variable approaches setpoint. As the process variable approaches setpoint, the controller acts as a fast responding analog controller thereby "tailoring" a control variable to precisely bring the process variable to the setpoint without exceeding or overshooting the setpoint.

15 Claims, 4 Drawing Sheets

FEEDBACK CONTROL SYSTEM

Figure 1: FEEDBACK CONTROL SYSTEM

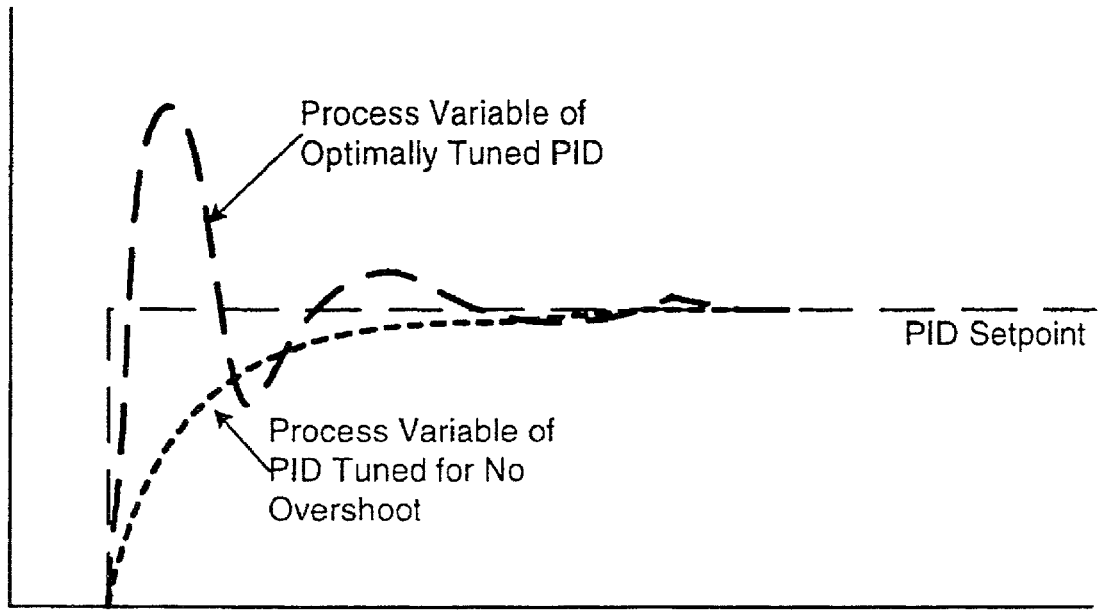
Figure 3: OPTIMALLY TUNED PID CONTROLLER CURVE
Prior Art Reference
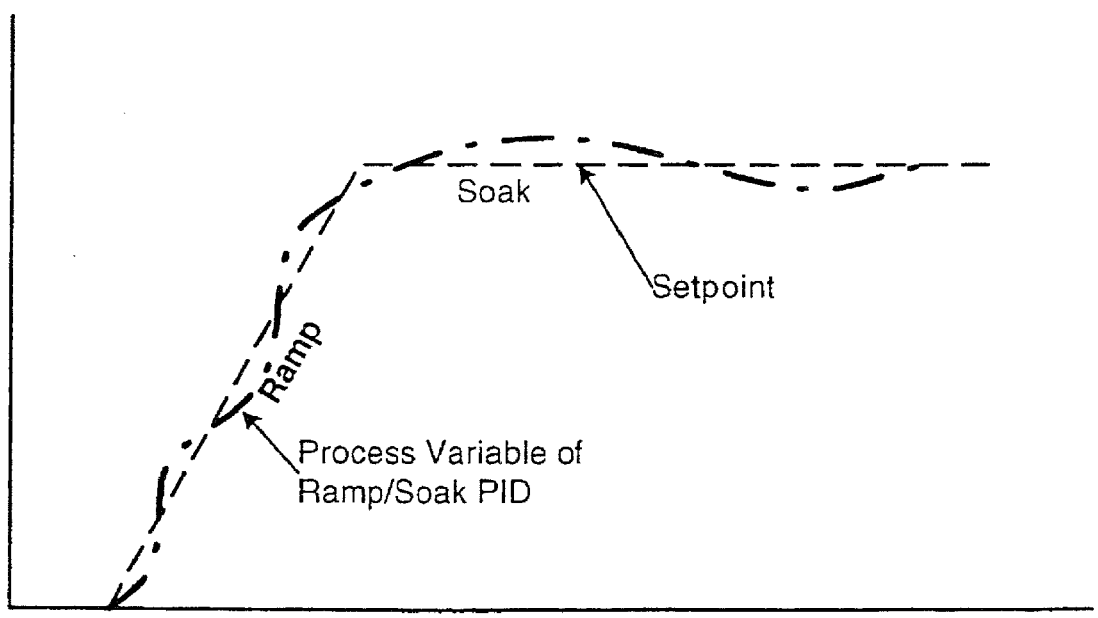
Figure 4: RAMP/SOAK CONTROLLER CURVE
Prior Art Reference

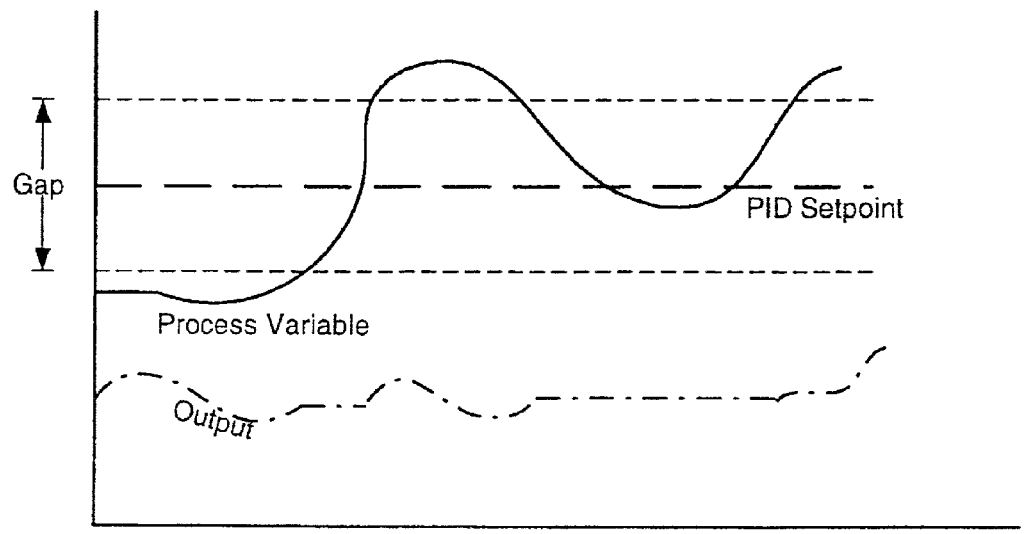
Figure 5: PID GAP CONTROLLER CURVE
Prior Art Reference
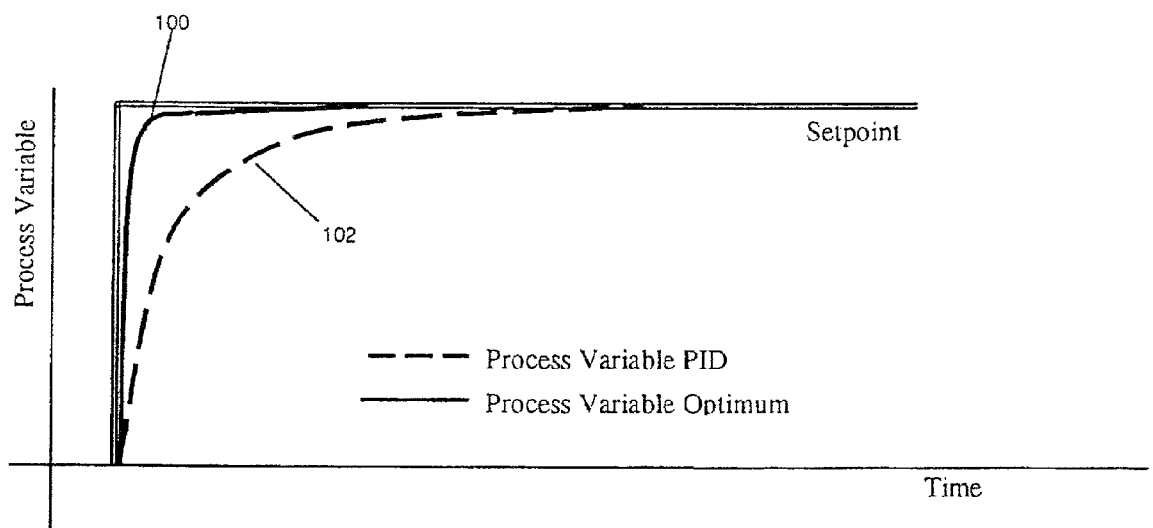
Figure 6: ASYMPTOTIC APPROACH / PID W/O OVERSHOOT CURVES

PROCESS FOR RAPIDLY CONTROLLING A PROCESS VARIABLE WITHOUT OVERSHOOT USING A TIME DOMAIN POLYNOMIAL FEEDBACK CONTROLLER

CROSS REFERENCE TO PRIOR APPLICATION

This application is a continuation of, and claims the benefit under 35 U.S.C. §120 of the filing date of, U.S. patent application Ser. No. 11/173,024 filed Jul. 1, 2005 which is a continuation in part of, and claims the benefit under 35 U.S.C. §120 of the filing date of, U.S. patent application Ser. No. 09/771,799, filed Jan. 29, 2001.

BACKGROUND OF THE INVENTION

This invention relates generally to the field of industrial process control, and particularly to a method for rapidly controlling a measured variable of a process from an existing value to a very divergent desired value without an overshoot beyond the new value.

Analog Controllers

An analog controller receives a continuous analog signal input that represents a measured process value or variable (PV) from a sensor and compares this value to the desired value setpoint (SP) to produce an error signal (ES). The controller uses this error to calculate any required correction and sends a continuous analog signal output (control variable), to a final control element (any continuously variable valve, damper, pump, fan, etc.). The final control element (FCE) then controls the process variable.

Proportional-Integral-Derivative (PID)

The original analog controller had only Proportional, or gain, control. This controller compared the process variable to the setpoint and varied the control variable as a Docket 172.02 selected multiplication value, which could be more or less than one. Because the amount of control variable change, due to deviation of the process variable from the setpoint, decreased as the process variable neared the setpoint, the process variable could continue to deviate (droop) from the setpoint indefinitely. To overcome this it was necessary to manually offset the setpoint, above or below, the desired operating value.

A function to overcome this droop was developed and was called Integral, or Reset, and was made a part of the Proportional control. This integrated the error signal as a function of the time during which the offset continued. The amount of Integral effect was preselected by manual adjustment.

Because Proportional control and Proportional plus Integral control could not react quickly to a process with significant dead time (delays in a process change in response to a FCE change), another control mode was developed and added to the analog controller. This function was named Derivative and measures the speed of process variable deviation from setpoint. The controller calculates an addition or subtraction to the control variable based on this deviation speed. The magnitude of derivative action in relation to the speed of deviation is preselected by manual adjustment.

These three modes of control may be adjusted (tuned) to work well on a continuous process, but tend to overshoot above and below setpoint during an initial start-up of a process and will oscillate for many cycles. These oscillations may be extreme enough that the process material is ruined or an unsafe situation occurs.

Multiple attempts have been made to control to a predetermined value (setpoint) without the measured parameter (process variable) exceeding the setpoint using the PID. The original method, and still the most common, to move the process variable to the setpoint is to configure the PID tuning parameters to slow response to process variable disturbance. See FIG. 3. A number of variations to the PID controller have been developed to solve the problem of rapidly moving the process variable, for example, setpoint suppression/reset, ramp/soak, and gap control. Setpoint suppression/reset involves setting an intermediate PID setpoint at some value less than the actual setpoint until the process variable reaches that intermediate setpoint. At that point, the controller setpoint is adjusted to the actual setpoint allowing the process variable to reach that setpoint. A ramp/soak controller moves the PID controller setpoint in small increments (ramps) over time until the controller setpoint reaches the desired setpoint. The controller then holds the process variable at the desired setpoint (soak). See FIG. 4. A gap controller utilizes a PID controller with a downstream "switch" that freezes the final control element when the process variable is within a predetermined band around the setpoint. See FIG. 5.

One of the more recent developments involves using fuzzy logic to anticipate overshoot resulting from the PID calculations. For example, see the patent to Lynch, F. U.S. Pat. No. 5,909,370 (1999) (referred to herein as Lynch). In this method, a fuzzy logic algorithm is used to suppress the setpoint. This is analogous to the setpoint suppression/reset described above. The fuzzy logic algorithm varies the magnitude of the setpoint suppression.

Currently, over 90% of all analog industrial controllers are a form of the PID controller. This controller has been shown to provide the minimum Integrated Average Error (IAE) in continuous control applications where process variable overshoot is acceptable; please see McMillan, G. (1994) *Tuning and Control Loop Performance*, Instrument Society of America, North Carolina (incorporated herein by reference and referred to herein as McMillan).

The standard PID is also the primary controller used for applications where overshoot is not allowed. However, PID controllers with no-overshoot tuning parameters result in relatively slow performance. See FIG. 3. The reason for this slow performance is that the no-overshoot tuned PID controller begins adjusting the final control element sooner than necessary. Thus, unnecessary time is required to move the process variable to the setpoint. This is because the quantity of controlled material delivered through the final control element, when it is not at its full ON position (or OFF position, if applicable to the specific system), is less than if that control element were fully ON (or OFF) longer.

The most significant shortfall of the traditional PID, when used in applications where overshoot is not allowed, is that the PID does not have a feature ensuring the final control element is set OFF (as used herein, the terms OFF and ON represent succession of the control medium whether the process variable approaches the setpoint from above or below) as the process variable reaches the setpoint. The PID output often does not begin reversing direction (reducing its output after an increasing output) until after the process variable passes the controller's setpoint. Thus, the PID controller does not have systems to prevent or minimize overshoot. Often, a maximum setpoint exists where a process operates optimally. In some cases, however, that process cannot exceed that maximum setpoint without damage occurring to the environment or to the equipment or product. For example, a cereal tastes better when the berry is cooked at 99° C. but the berry's sugar is significantly changed if cooked at 100° C. In the more extreme case of an exothermic reaction, a reactor might explode or the relief devices actuate, if that maximum setpoint is exceeded. Without a method to ensure the final control element is set OFF if the process variable moves beyond the setpoint, the PID controller cannot ensure this damage does not occur. Thus batches can fail and equipment or environmental damage can occur when the PID controller is used for these applications. In these applications, control practitioners often set the operating setpoint below this maximum setpoint. The result is the process does not operate at the optimal point, increasing production times or decreasing production yields.

Setpoint suppression/reset, while commonly utilized in applications where overshoot is not allowed, also has slow performance as the controller first reduces the final control element's percent ON to meet the intermediate setpoint. After the intermediate setpoint is reached, the controller increases the final control element's percent ON to reach the actual setpoint. The controller reduces the percent ON when the process variable reaches the actual setpoint. Extra time is required to reach the actual setpoint than if the controller were able to move the process variable directly to the setpoint.

Ramp/soak controllers are effective in applications in which overshoot is not allowed. Typically, the final control element's percentage ON is in the middle of its percentage ON range. Because the controller's equipment is not immediately positioned at its desired value, the final control element is not held at full ON position for the maximum time while the process variable is approaching setpoint.

While gap controllers ensure the final control element's output is set OFF when the process variable is near the setpoint, the controller acts as an on/off controller near the setpoint. Because of this action, the controller's precision is not the quality of the traditional PID or other controllers.

The fuzzy logic controller proposed by Lynch has the same shortcomings as the setpoint suppression/reset described above along with the added complexity of the fuzzy logic controller.

Fuzzy logic currently is not supported by most industrial controllers and requires significant computing resources to implement.

Thus, a need exists for a controller that moves the process variable to the setpoint more rapidly than PID controllers, yet without overshooting the setpoint.

Feed-Forward Control

Feed-forward control was developed to anticipate control system corrections to process disturbances before the actual process receives the disturbance. Feed-forward control attempts to measure upsets (disturbances) to the process before the upset reaches the process. The controller then calculates corrections for those upsets. An example would be a house having a method to measure whether or not the front door is open and to measure the outside temperature. If the front door opens and a significant difference exist between the outside and inside temperatures, the heating/air conditioning system would start although the inside temperature is presently at the desired value.

The most significant shortfall of the feed-forward controller involves the requirement that the process under control be well understood. Often when implementing these controllers, a disturbance (an event that drives the process from the setpoint) that was not anticipated by the engineer configuring the controller attacks the process. The disturbance can make the process unstable resulting in process or equipment failure or an unsafe condition.

Model-Based Control

The latest developments in process control have been focused on advanced control algorithms including: state-space variable controllers, neural network controllers, artificial intelligence controllers, fuzzy logic controllers etc, further referred to as model-based controllers. Model-based control uses a mathematical representation of an ideally operating process to calculate correction to process upsets. The control practitioner develops the model controller based on anticipated or expected disturbances and the desired process response. Model based control uses a mathematical representation of the process to calculate corrections to process upsets. The model is typically developed using complex mathematical systems such as state-space variable matrices.

As the cost of computing systems is falling, using model-based controllers is becoming more practical. For applications where absolute control system accuracy is necessary, model-based controllers offer significant promise and advancement beyond current technologies.

However, these controllers are very complex and require advanced engineering support to deploy, maintain and modify, increasing the cost of the control system. Because of the complexity of this type of controller, significant computing resources are required to implement these controllers. Most contemporary industrial controllers do not have these computing resources available and those that do are quite expensive. Thus, to date, these controllers have not been widely used in industrial applications.

Contemporary model-based controllers also require that the process under control be well understood and therefore they suffer from the same short coming as feed-forward controllers when the control practitioner overlooks a source of disturbance. As stated above, this disturbance can make the process unstable resulting in process or equipment failure or an unsafe condition. Thus, control practitioners hesitate in implementing these controllers on new processes. In most cases, the control engineer will first install traditional feedback controllers, run the system to ensure all disturbances have been identified and then design the model-based controller. Clearly, the cost to install model-based controllers on new processes can be prohibitive.

Ingredient Addition/Filling Operations

The main analog technique employed to add ingredients or fill products is the full/trickle mode where the control element is set to a "minimum" position as the ingredients near the setpoint. The predominant technique employed to add ingredients or fill products is to start adding the product at full rate. When the added product nears the setpoint, the controller switches to a "trickle" mode in which the product flow is reduced to 10% to 25% of the full rate. When the product quantity is within acceptable error tolerances, the product flow is stopped. This trickle rate is often implemented with a second final control element.

The full/trickle mode method for ingredient addition has worked successfully for many years. It is especially successful when the motive force supplying the ingredients is constant. However, this controller's precision is reduced when that motive force varies. This is because the controller's full OFF point is dependent upon a fixed quantity of material being transferred after the final control element is fully OFF. If that force varies, the quantity of material varies. Another shortcoming of the full/trickle mode for ingredient addition is that, at the predetermined intermediate setpoint, the final control element is set to a reduced percent ON. A better method would have that final control element continuously set OFF as the ingredient quantity approaches the setpoint.

Other Prior Art References:

Traditional control theory texts, such as "Grundlagen der Regelungstechnick" Fundamentals of Control Engineering by Dorrscheidt and Latzel, Teubner-Verlag, Stuttgart, 1993 have referred to using polynomials in feedback control strategies.

While control theory texts have suggested that polynomials would make effective feedback controllers, these controllers applied polynomials in the frequency domain, not the time domain. When frequency domain polynomials of the forms:

$$\frac{1}{s^2 - a^2} \text{ or } \frac{s}{s^2 - a^2}$$

are inverse Laplace transformed back to the time domain, the resultant equations are of the form:

$$\frac{1}{a} \sin at \text{ or } \cos at$$

These equations result in oscillatory response from the controller, an undesirable result for process control where linear outputs are required. (Note: t is defined in these examples as the error calculation result.) If, in a more general form, the polynomial is of higher order:

$$\frac{1}{(s-a)^n} \text{ where } n = 1, 2, 3 \ldots$$

The inverse Laplace transform is:

$$\frac{1}{(n-1)!} t^{n-1} e^{at}$$

References such as Beyer, W. (1981), *CRC Standard Mathematical Tables*, CRC Press, Inc., Boca Raton, Fla. describe inverse Laplace transforms.

This resultant controller equation includes an exponential function ($e^{at}$). The exponential function, by definition, does not allow the control variable to go to zero. Thus, if the process variable moves past the setpoint, the controller's output would still be greater than zero continuing to add energy or ingredients erroneously.

In order for a controller to be successfully employed in contemporary industrial process controllers (simple software based computing type, traditional electrical/electronic, pneumatic, hydraulic, etc.), the controller's equations need to be time domain based. Though frequency domain type controllers have been used in linear control applications (aircraft control for example) for some time, these controllers require significant computing resources or electronics to deploy. The frequency domain controller is not economically feasible to be utilized for process control applications.

Previous attempts have been made that use an asymptotic approach to setpoint, specifically Rae, Richard, U.S. Pat. No. 4,948,950 (incorporated herein by reference and referred to herein as Rae). However, Rae's method uses a linear algebraic equation for development of the ". . . the target slope below the setpoint temperature or is the target rate of change of the temperature of the output heating effect of the heating means . . . ." Because the equation is a linear function, the process variable does not approach setpoint as quickly as if the equation incorporated an "th-order exponential term. Thus, the control equation proposed by Rae wastes resources, for example time and energy, when applied to a system in which movement of the process variable to setpoint as rapidly as possible, without overshoot, is the key control method selection criteria.

BRIEF SUMMARY OF THE INVENTION

This invention is a method for rapidly controlling a process variable to a setpoint without overshoot using a time domain polynomial feedback controller. This controller first sets its output to zero if the error is negative. Otherwise the controller's output is calculated from the error signal using a time domain polynomial equation. For applications where long-term setpoint maintenance is required, the controller includes a method to automatically execute an integral correction feature. After the process variable has reached setpoint, the controller also includes a feature to automatically improve the controller's parameters. The resulting method controls process variable on its path to the desired setpoint in a quicker manner than contemporary industrial controllers.

This controller may also be utilized in product filling/ingredient addition applications resulting in lower material usage due to the more precise control.

Objects and Advantages

Accordingly, several objects and advantages of this invention are:

It provides a method to control a process variable to a setpoint without overshoot more rapidly than traditional Proportional-Integral-Derivative (PID) controller tuned for no overshoot.

It is easier to understand than the PID and other controllers.

It requires fewer resources (hardware, software, etc.) than other controllers and, because it is time domain based, may be directly implemented in contemporary industrial controllers.

It ensures the controller output is zero if the process variable moves beyond the setpoint while maintaining full control of the process variable until the process variable reaches the setpoint in a feedback controller configuration.

It reduces required energy to reach setpoint in process control applications where overshoot is not allowed.

It reduces raw material/product variability in ingredient addition/filling applications employing an analog final control element.

It may be implemented with traditional sensors and final control elements.

Further objects and advantages of this invention will become apparent from consideration of the drawings and ensuing description.

BRIEF DESCRIPTION OF THE SEVERAL VIEWS OF THE DRAWINGS

FIG. 3 is a prior art plot illustrating a process variable controlled by a properly tuned PID controller and a PID controller tuned for no overshoot.

FIG. 4 is a prior art plot illustrating an ideal process variable controlled by a properly tuned Ramp-Soak PID controller.

FIG. 5 is a prior art plot illustrating a process variable controlled by a Gap PID controller.

FIG. 6 is a plot illustrating a process variable controlled by a PID controller tuned for no overshoot and a process variable controlled by a time domain feedback polynomial controller with typical parameters.

DETAILED DESCRIPTION OF THE INVENTION

Figure 1:
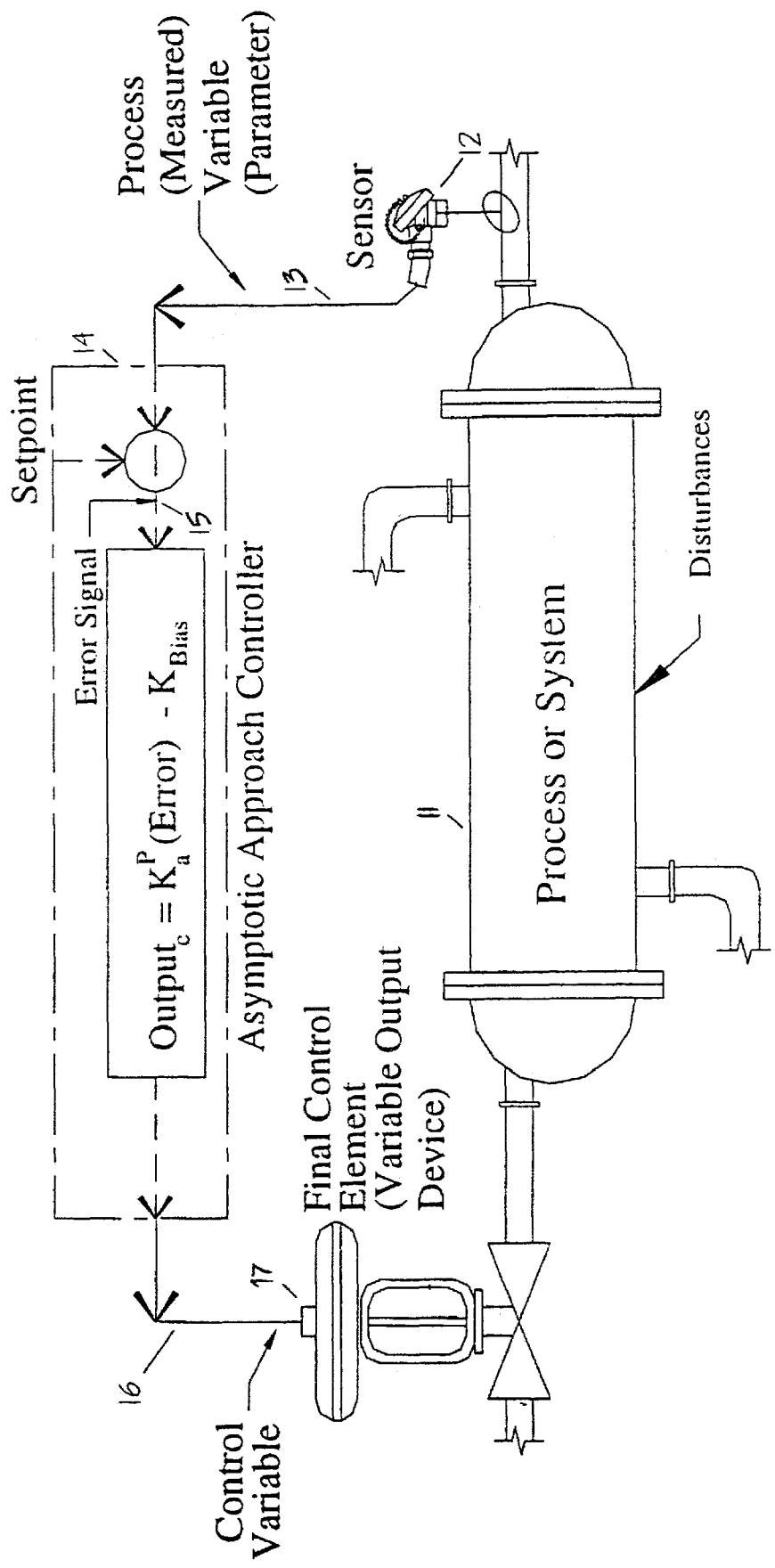
FIG. 1 is a block diagram of a control system including the polynomial controller as utilized in accordance with the method of the present invention.

FIG. 1 is a block diagram of a standard process/system in need of control with a feedback control system. This system has: a general process or system 11, a sensor 12 to measure a process variable 13, an analog controller 14 and a final control element 17 as its general equipment.

The process variable is a parameter that is an indication of the chemical or physical state of that system. The controller is a hardware or software based device that is used to calculate corrections to differences between a setpoint and the measurement. The first operation within the controller is a means to calculate an error signal 15 that is the difference between a setpoint and the process variable. The controller operates upon the error signal 15 to calculate a control variable 16. The control variable is the position at which the final control element needs to operate in order for the process variable to reach and maintain the setpoint. The final control element may be any variable output device. While a valve is shown in FIG. 1, any variable output device may be used.

Figure 2:
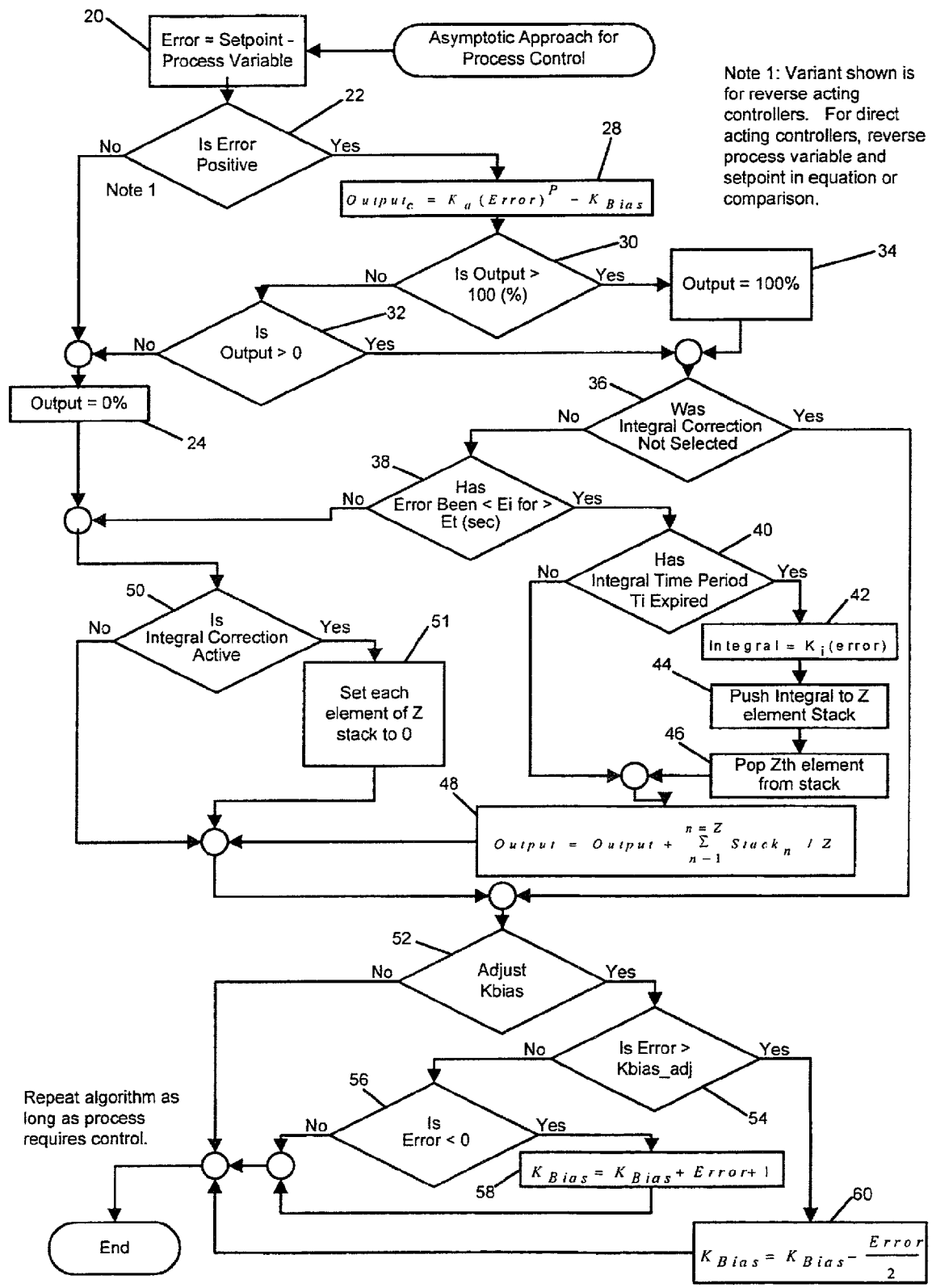
FIG. 2 is a flow chart of operations that comprise the method of the present invention.

An embodiment of the controller of this invention is illustrated in FIG. 2: Asymptotic Approach Algorithm Flowchart. The controller has a means 20 to calculate an error signal. The controller compares the error signal 15 to zero. If the error signal 15 is negative, the controller's output 16 is set to zero. If the error signal 15 is positive, the output 16 is calculated using an inverted polynomial equation having the form $Y=A(x)^P+B(x)-C$ or the form $Y=A(x)^P-B$ such as a time-domain polynomial Equation 28 of the type as follows:

$$\text{Output}_c = K_a(\text{Error})^P - K_{Bias}$$

Where:
$K_a$ is Term 1 Gain (unitless)
$P$ is Exponential Term (unitless)
$K_{Bias}$ is Output Bias (unitless)

Returning to FIG. 2, the control variable 16 is checked to ensure that it is less than 100% 30. If it is not, the control variable 16 is set to 100% 34. The control variable is checked to ensure that it is positive 32 if it is less than 100%. If negative, the control variable 16 is set to zero 24.

The controller checks to determine if Integral Correction 36 is to be executed. If Integral Correction is selected, the controller checks to determine if the process variable 13 is within a user selected error band $E_i$ for a user selected time $E_t$ 38. If Integral Correction is activated 38, a means to integrate and average the error signal 15 over time is used. The result of the averaged-integrated error signal is added, positively or negatively, to the polynomial equation output as follows:

$$\text{Output}_c = K_a(\text{Error})^P - K_{Bias} + \text{Integrated\_Error}$$

While not the only method, one method to integrate the error is shown in FIG. 2. At user defined intervals 40, the current error signal 42 (and 15), is "Pushed" or loaded into the first position of a Z element software stack 44. At this same time, the $Z^{th}$ element is "Popped" or unloaded from the stack and discarded 46. The stack is summed and averaged as described above 48. If integral correction is active 50 and the error is negative 22, set each element of the previously defined software stack to zero 51.

If the error signal 15 is negative while Integral Correction 38 is active, averaged integrated error output is set to zero 52. Thus the integration operation will start from zero the next time Integral Correction 38 is executed.

The next function of the controller is a user selectable method to improve the $K_{Bias}$ term. If the user has selected Automatic Bias Improvement 52, the error signal 15 is checked against a user selected $K_{bias\_adj}$ 54 at the time point 38 that Integral Correction is initiated if used. If the error signal is greater than $K_{bias\_adj}$ 54 and positive, the new $K_{bias\_adj}$ is calculated as follows 60:

$$K_{Bias} = K_{Bias} - (\text{Error}/2).$$

If the error signal is greater than $K_{bias\_adj}$ 54 and negative 56, the new $K_{bias\_adj}$ is calculated as follows 58:

$$K_{Bias} = K_{Bias} + ABS(\text{Error}) + 1 \text{ [where ABS is absolute value function]}$$

If the process remains in need of control, the algorithm is repeated from the top of the flowchart.

Pseudocode For Asymptotic Approach Algorithm

The following is a pseudocode description of this invention:

```
10    If Process Variable > Setpoint (for reverse acting process) {If Process Variable<Setpoint
      (for direct acting processes)} [IF-THEN-ELSE Structure 1]
20    Then:
30        Calculate the error signal:
              Error = Measurement − Setpoint [for reverse acting processes]
              Error = Setpoint − Measurement [for direct acting processes.]
40        Calculate Control Variable:
              Output_c = K_a(Error)^P − K_Bias
              Where:

K_a     is   Term 1 Gain (unitless)
              P       is   Exponential Term (unitless)
              K_Bias  is   Output Bias (unitless)
              Output_c is  Equation Output
50     If Output_c > 100% [IF-THEN-ELSE Structure 2]
60     Then
70         Output = 100% [maximizing controller input to process]
80     Else [IF-THEN-ELSE Structure 2]
90         If Output_c < 0% [IF-THEN-ELSE Structure 3]
100        Then
110            Set Output to 0% [stopping controller input to process]
120        Else [IF-THEN-ELSE Structure 3]
130            Output = Output_c
140            If Error < E_i for E_t [IF-THEN-ELSE Structure 4]
                   [Where: E_i = User Selected Error at which point polynominal calculation stops
                   execution and integral correction begins execution. If user does not desire
```

-continued

|  |  |
|---|---|
|  | Integral Correction, this value is set to zero. |
|  | $E_t$ = User Selected Time at which point polynominal calculation stops execution and integral correction begins execution.] |
| 150 | Then: |
| 160 | If Time < $T_i$ [IF-THEN-ELSE Structure 5] |
|  | [Where: $T_i$ = User Selected Integral Time Period] |
| 170 | Then |
| 180 | Integral = $K_i$ |
|  | [Where: $T_i$ = User Selected Integral Time Period |
| 190 | Push Integral to Z element Integral Stack |
| 200 | Pop $Z^{th}$ element from Integral Stack] |
| 210 | Else [IF-THEN-ELSE Structure 5] |
| 220 | Endif [IF-THEN-ELSE Structure 5] |
| 230 | $$Output = Output_c + \sum_{Z=1}^{Z=n} Stack_n \, l \, Z$$ |
| 240 | If User Selected Automatic Parameter Improvement [IF-THEN-ELSE Structure 6] |
| 250 | Then |
| 260 | If Error > $K_{bias\_adj}$ [IF-THEN-ELSE Structure 7] |
| 270 | Then |
| 280 | $K_{Bias} = K_{Bias} - (Error/2)$ |
| 290 | Else [IF-THEN-ELSE Structure 7] |
| 300 | If Error < 0 [IF-THEN-ELSE Structure 8] |
| 310 | Then |
| 320 | $K_{Bias} = K_{Bias} + ABS(Error) + 1$ |
|  | [where ABS is absolute value function] |
| 330 | Else [IF-THEN-ELSE Structure 8] |
| 340 | Endif [IF-THEN-ELSE Structure 8] |
| 350 | Else [IF-THEN-ELSE Structure 7] |
| 360 | Endif [IF-THEN-ELSE Structure 7] |
| 370 | Endif [IF-THEN-ELSE Structure 6] |
| 380 | Else [IF-THEN-ELSE Structure 4] |
| 390 | Endif [IF-THEN-ELSE Structure 4] |
| 400 | Endif [IF-THEN-ELSE Structure 3] |
| 410 | Endif [IF-THEN-ELSE Structure 2] |
| 420 | Else: [IF-THEN-ELSE Structure 1] |
| 430 | Set Output to 0% [stopping controller input to process] |
| 440 | If Integral Cerrection is active [IF-THEN-ELSE Structure 9] |
| 450 | Set each element of PI stack to Zero |
| 460 | Else [IF-THEN-ELSE Structure 9] |
| 470 | Endif [IF-THEN-ELSE Structure 9] |
| 480 | Endif [IF-THEN-ELSE Structure 1] |

Repeat algorithm while process is in operation

Additional Embodiment

A means is provided for inclusion of a first order $K_b$ term in the controller Equation 28:

$$Output_c = K_a(Error)^P + K_b - K_{Bias}$$

Where:
$K_a$ is Term 1 Gain (unitless)
$P$ is Exponential Term (unitless)
$K_b$ is Term 2 Gain (unitless)
$K_{Bias}$ is Output Bias (unitless)

It is understood that a $K_b$ term will be set to zero in almost all applications. This is because a similar curve may be obtained from this equation with a $K_b$ greater than zero as the curve generated with Equation 28 with a $P$ term between 1.0 and 2.0. However, the $K_b$ is included here for completeness of the controller and to allow the user another method to achieve a specific process variable curve.

Operation—FIGS. 1 and 2

The controller first calculates the error signal 15. The error signal 15 is then checked to verify the error signal 15 is positive. If not, the control variable 16 is set to zero along with the Integral Correction 38, if used.

If the error signal 15 is positive, the controller uses the error signal 15 to calculate the final control element's 17 position. The error signal 15 is raised to the power $P$. Thus, the process variable approaches the setpoint asymptotically or follows a parabolic curve when approaching the setpoint. See FIG. 6 100. IF process and instrument systems were ideal, the energy or ingredients would not continue to be supplied to the system at the point the process variable 13 equals the setpoint as the final control element is set to zero at this point. However, systems take time to react. Final control elements need time to position, processes need time to react or operate, and sensors need time to measure. The summation of this time quantity is known as dead-time. To overcome the problem of dead-time in this invention, a user configured $K_{Bias}$ is subtracted from the intermediate control variable. This ensures the final control element 17 is set to zero while the dead-time expires and the process variable 13 does not exceed the setpoint.

If the user selectable Integral Correction 36 is selected, it acts to overcome differences between the setpoint and the process variable 13. The user would select Integral Correction 36 if long-term setpoint maintenance were desired. An example application would include batch reactor temperature adjustment application where the reactor's ingredient temperature moves toward ambient temperature over time. Integral Correction 36 would be bypassed for applications where the system is reset immediately after the control variable is set to zero. Example applications where Integral Correction 36 would not be used would be ingredient addition or product filling type applications.

After the controller moves the process variable 13 close to the setpoint, the system may switch to Integral Correction if configured to do so by the user. If selected, Integral Correction 38 integrates the error of recent time and adds that integrated-averaged resultant to the control variable. Thus any difference between the process variable and the setpoint will be eliminated. To minimize process variable 13 overshoot after the controller switches to Integral Correction 38, the averaged-integrated error resultant is set to zero 52 along with any integration "history" if the process variable 13 moves beyond the setpoint while Integral Correction 38 is active. Thus, the integration operation will start from zero the next time Integral Correction 38 is executed.

To improve the $K_{bias}$ term, the controller includes a user selectable option to automatically adjust that term. At the same time point that Integral Correction 38 would be executed, Automatic Bias Improvement is executed, if the user has so selected. The error signal 15 is first checked to ensure it is positive. If positive, the current error is divided by two and that becomes the new $K_{bias}$. If negative, one is added to the current $K_{bias}$. The algorithm is repeated as long as the process/system 11 is active.

Thus, as seen in FIG. 6, this control method moves the process variable 13 to the setpoint more rapidly than does the PID controller 102 tuned for no overshoot. Because of this, applications in which overshoot is not allowed will use less energy or ingredients to reach setpoint when this controller is used. In practice, notable reductions in process execution times, and energy used, have been realized.

If the process variable moves beyond the setpoint, this controller ensures the output is set OFF due to FIG. 2, 22 along with $K_{Bias}$ task. Thus, overshoot is prevented while having the process variable rapidly move to the setpoint when this controller is properly applied.

Also, the controller utilizes a relatively simple polynomial equation to derive its control variable and does not require significant hardware or computing resources to deploy. Another advantage of the polynomial equation based controller is it is easier to understand than calculus based functions of the controller types.

As the controller does not require significant resources to deploy, it may easily be implemented using contemporary industrial controllers, sensors, and final control elements.

As the method that the process variable approaches the setpoint is a smooth continuously decreasing asymptote, this controller offers an improved method to add ingredients or fill products over the full/trickle method. This is because the full/trickle method had three discrete step reductions in ingredient flow: full, trickle, and off. Thus, product variability is reduced as the control precision is increased.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A method for controlling the transfer of a material into a container without overshooting a set point indicative of the container being filled to a desired amount using a feedback controller which generates a controller output signal which is communicated to a variable output device by which the flow of material into the container may be varied in accordance with the controller output signal; the method comprising the steps of:
 measuring a process variable indicative of the amount of material added to the container;
 calculating an error signal by comparing the process variable to the set point;
 if the error signal is less than or equal to zero, setting the controller output signal to zero to prevent flow of material through the variable output device and into the container;
 if the error signal is positive, calculating the controller output signal using a polynomial equation, which includes the error signal raised to an exponential term reduced by a bias tuning parameter, and if the value of the controller output signal is calculated as equal to or less than zero, setting the controller output signal to zero;
 communicating the controller output signal to the variable output device to control the flow of material therethrough and into the container without overshooting the set point; and
 repeating the steps until the controller output signal communicated to the variable output device is zero.

2. The method as in claim 1 wherein the controller output signal is calculated using the equation $Output_c = K_a(Error)^P - K_{Bias}$; wherein $Output_c$ is controller output signal, $K_a$ represents gain, Error is the error signal, P is the exponential term to which the error signal is raised, and $K_{Bias}$ represents the bias tuning parameter.

3. The method of claim 2 comprising the further step of selectively adjusting the bias tuning parameter, after the controller output signal is set to zero, by comparing the error signal to a bias adjustment parameter and if the error signal is greater than the bias adjustment parameter and positive, the bias tuning parameter is recalculated by subtracting a selected amount from the bias tuning parameter.

4. The method of claim 3 wherein in the step of recalculating the bias tuning parameter, the amount subtracted from said bias tuning parameter is equal to half of the error signal.

5. The method of claim 3 wherein if the error signal is greater than the bias adjustment parameter and negative, then the bias tuning parameter is recalculated by adding to the bias tuning parameter an amount equal to one plus the absolute value of the error signal.

6. A method for controlling the transfer of material into a succession of containers without overshooting a set point indicative of each container being filled to a desired amount using a feedback controller which generates a controller output signal which is communicated to a variable output device by which the flow of material into each container may be varied in accordance with the controller output signal; the method comprising the steps of:
 a) measuring a process variable indicative of the amount of material added to a first of the containers;
 b) calculating an error signal by comparing the process variable versus the set point;
 c) if the error signal is less than or equal to zero, setting the controller output signal to zero to prevent flow of material through the variable output device and into the container;
 d) if the error signal is positive, calculating the controller output signal using a polynomial equation, which includes the error signal raised to an exponential term reduced by a bias tuning parameter and if the value of the controller output signal is calculated as equal to or less than zero, setting the controller output signal to zero;
 e) communicating the controller output signal to the variable output device to control the flow of material therethrough and into the first container without overshooting the set point;

f) repeating steps a) through e) until the controller output signal communicated to the variable output device is zero; and then g) repeating steps a) through f) for each of said succession of containers after said first container.

7. The method of claim 6 wherein the controller output signal is calculated using the equation $Ouput_c = K_a(Error)^P - K_{Bias}$; wherein $Ouput_c$ is controller output signal, $K_a$ represents gain, Error is the error signal, P is the exponential term to which the error signal is raised, and $K_{Bias}$ represents the bias tuning parameter.

8. The method of claim 7 comprising the further step of selectively adjusting the bias tuning parameter, after the controller output signal is set to zero, by comparing the error signal to a bias adjustment parameter and if the error signal is greater than the bias adjustment parameter and positive, the bias tuning parameter is recalculated by subtracting a selected amount from the bias tuning parameter.

9. The method of claim 8 wherein in the step of recalculating the bias tuning parameter, the amount subtracted from said bias tuning parameter is equal to half of the error signal.

10. The method of claim 8 wherein if the error signal is greater than the bias adjustment parameter and negative, then the bias tuning parameter is recalculated by adding to the bias tuning parameter an amount equal to one plus the absolute value of the error signal.

11. A method for controlling a variable output device so that a process variable associated with an output from said variable output device does not overshoot a setpoint, the method comprising the steps of:

measuring a process variable associated with an output from said variable output device;

calculating an error signal by comparing the process variable to the setpoint;

setting a controller output signal from said controller to zero if said error signal is less than or equal to zero;

if the error signal is positive, calculating said controller output signal using a polynomial signal which includes the error signal raised to an exponential term reduced by a bias tuning parameter; and if the value of the controller output signal is calculated as equal to or less than zero, setting the controller output signal to zero;

communicating the controller output signal to the variable output device to adjust the output from said variable output device without overshooting the set point; and repeating the steps until the controller output signal communicated to the variable output device is zero.

12. The method as in claim 11 wherein the controller output signal is calculated using the equation $Ouput_c = K_a(Error)^P - K_{Bias}$; wherein $Ouput_c$ is controller output signal, $K_a$ represents gain, Error is the error signal, P is the exponential term to which the error signal is raised, and $K_{Bias}$ represents the bias tuning parameter.

13. The method of claim 12 comprising the further step of selectively adjusting the bias tuning parameter, after the controller output signal is set to zero, by comparing the error signal to a bias adjustment parameter and if the error signal is greater than the bias adjustment parameter and positive, the bias tuning parameter is recalculated by subtracting a selected amount from the bias tuning parameter.

14. The method of claim 13 wherein in the step of recalculating the bias tuning parameter, the amount subtracted from said bias tuning parameter is equal to half of the error signal.

15. The method of claim 13 wherein if the error signal is greater than the bias adjustment parameter and negative, then the bias tuning parameter is recalculated by adding to the bias tuning parameter an amount equal to one plus the absolute value of the error signal.

* * * * *